Figure 2:
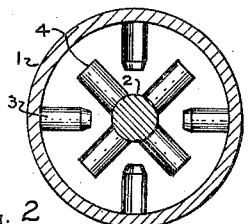

Jan. 29, 1957

W. H. VINING 2,779,752

APPARATUS FOR CHEMICAL REACTIONS PASSING THROUGH VISCOUS PHASE

Filed Nov. 18, 1953

3 Sheets-Sheet 1

*INVENTOR.*
William H. Vining

BY

*ATTORNEY*

United States Patent Office 2,779,752
Patented Jan. 29, 1957

2,779,752

APPARATUS FOR CHEMICAL REACTIONS PASSING THROUGH VISCOUS PHASE

William H. Vining, Niagara Falls, N. Y., assignor to E. I. du Pont de Nemours and Company, Wilmington, Del., a corporation of Delaware Application November 18, 1953, Serial No. 392,855

10 Claims. (Cl. 260—91.3)

This invention relates to means for conducting chemical reactions which pass through a highly viscous or gel formation phase.

Many chemical transformations, particularly where relatively large molecules are concerned, proceed through a very viscous, sticky or gel like stage which is troublesome to manage. Such a gel or high viscosity reaction phase interferes with proper control of the reaction mixture and generally necessitates the use of special, massive equipment for stirring, agitating or mixing the reaction mass. There is generally great difficulty in carrying out such reactions by a continuous process because uniformity of product quality is difficult to obtain. Batch operation on the other hand involves higher production costs than continuous process operation.

The conversion of polyvinyl acetate into polyvinyl alcohol is important commercially and presents the problem of a gel stage in an aggravated form. Under conditions feasible for practical purposes the highly viscous gel phase cannot be avoided and therefore practically all current production of high quality polyvinyl alcohol of any desired degree of alcoholysis is made by batch operation in heavy kneader type mixing equipment. The process of making polyvinyl alcohol consists essentially of replacing the required percentage of acetate groups in the polyvinyl acetate starting material with hydroxyl groups by alcoholysis in an alcohol medium, preferably methyl or ethyl alcohol by the action of an alcoholysis catalyst such as alkali metal alcoholate. As the alcoholysis proceeds and the acetate groups are replaced by hydroxyl groups, the reaction mixture becomes more and more viscous and insoluble in the reaction medium, thus passing into a gel like phase difficult to manage.

The provision of an apparatus for carrying out chemical reactions as they pass through a highly viscous or gel phase is a major objective of this invention. Another object is apparatus suitable for conducting a chemical process in which the reaction mass passes through a gel phase in a continuous manner. A further object is a continuous process for conducting chemical reactions undergoing gel phase transformation. It is also a more specific object to provide a process and apparatus for the continuous production of polyvinyl alcohols of uniform properties by the alcoholysis with alkaline catalyst of polyvinyl acetate in methanol or ethanol by replacement of the desired percentage of acetate groups by hydroxyl groups. Other objects will be apparent in the further description of this invention.

These and other objects are accomplished by mixing the reactants and passing the reaction mixture continuously and at a predetermined rate and before it has entered the gel or high viscosity stage into a cylindrical reactor. Conditions are so maintained and timed in the reactor that the reaction mixture leaves the reactor only after a reaction stage has been reached such that further agitation to prevent agglomeration and gel formation is no longer necessary. The interior of the reactor is provided with alternately spaced baffles and moving agitator blades, the free space therebetween being filled with suitably sized spheres or balls so that the combination can provide efficient dispersing or disrupting action on the gel, said action being directed substantially at right angle to the general direction of flow of the reaction mixture and thereby preventing significant intermixing of reactant material of different or varying degrees of reaction. By this means a relatively uniform product can be prepared both with respect to degree of reaction and grain size of product if in solid form. The reaction can be stopped at a desired stage of reacton after the mixture has left the reactor by treating the product to inactivate the catalyst.

The invention will be described in greater detail as exemplified by the conversion of polyvinyl acetate to polyvinyl alcohol, however, it is not limited to this process but may be used by suitable adaptation in conducting any other transformation where the reaction mass undergoes a gel or high viscosity phase.

The accompanying drawings illustrate a preferred arrangement for practicing my invention.

Figure 1:
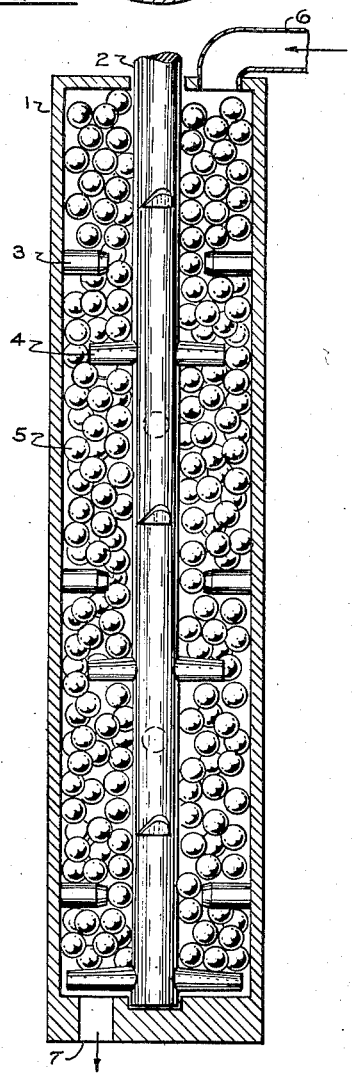

Figure 1. Diagrammatic view of reactor in vertical cross section.

Figure 2. Horizontal sectional plan of reactor.

Figure 3:
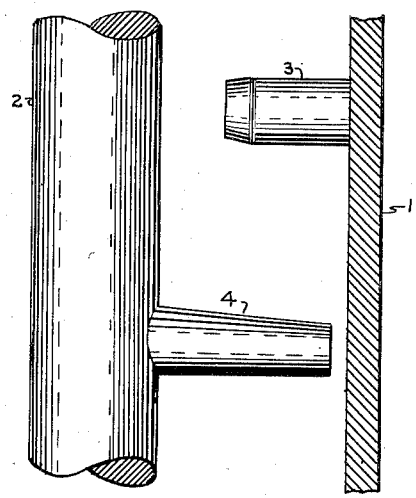

Figure 3. Detail of relationship between fixed baffle and moving agitator blade.

Figure 4:

Figure 4. Cross section of agitator blade.

Figure 5:
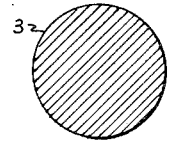

Figure 5. Cross section of fixed baffle.

Figure 6:
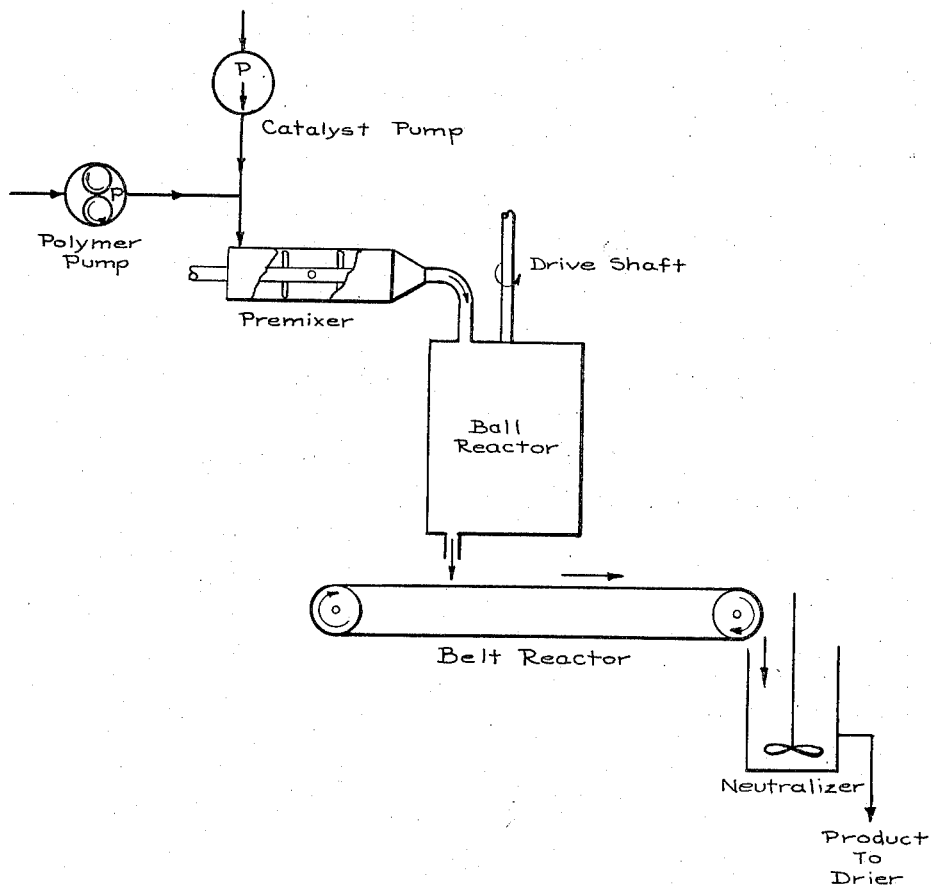

Figure 6. Schematic outline of reaction system applied to alcoholysis of polyvinyl acetate.

In the figures, the reactor, a cylindrical shell 1, preferably made of material resistant to the chemical action of the reaction mixture, must be physically rugged to withstand the grinding or milling action transmitted through shaft 2 rotated by power means not shown. Fixed baffles 3 are securely attached to the inner housing of the reactor and alternate in a staggered or symmetrical arrangement with agitator blades 4 securely attached to shaft 2. The space in the reactor shell is filled with balls 5 of such size that they permit the agitator blades 4 to move radially and thus transfer to the ball surfaces a grinding or kneading action. The balls filling the cylinder are all of substantially the same or uniform size. The clearance between the fixed baffles 3 and the agitator blades 4 is such that it at least slightly exceeds two ball diameters. Radial clearance between the fixed baffles and the rotating shaft 2 should preferably exceed by a small fraction the diameter of one ball, and the radial clearance between the inner side of the shell 1 and the moving agitators should also preferably slightly exceed one ball diameter to prevent any binding or plugging of the reactor contents.

A proposed arrangement of fixed baffles 4 and agitator blades 3 is shown in Figure 2. Other arrangements are possible provided they permit the agitation of a reactor filled with balls. Cross sectional views of the agitator blade Figure 4 and fixed baffle Figure 5 show preferred shapes for these functional units of the ball filled reactor. The leading edge of the agitator blade is preferably the blunt side of the agitator which is shown in Figure 4.

The reactor is provided with an inlet 6 for entrance of the reaction mixture. An outlet 7, at the lower end of the ball filled reactor is provided with means not shown to remove the reacted mixture at the desired rate. Means, not shown, to prevent the passage of the balls filling the reactor from leaving the reactor must be provided and may be a screen or grid covering the outlet without preventing the flow of the reacted mixture at the rate desired.

Considerable latitude is permissible as to the diameter of the spheres or balls filling the free space in the cylindrical reactor. Metal balls having diameters of about one-half inch have been found suitable, however, the diameters may be as small as one-eighth inch or less and may be as large as two or three inches. A ball size between about one-eighth to three-fourths inch is preferred. In general, the ball diameters should not be greater than about one-tenth the inner diameter of the reaction cylinder, although there is great latitude permissible on this point. Plastic balls have been used successfully and this invention is not restricted as to type of material. The balls must have adequate chemical and phyiscal properties for the reactions to be performed. Generally, steel balls will transmit energy to the reaction mixture more effectively than plastic balls.

Although a vertically disposed reactor permitting gravity flow of reactants is preferable, it is possible to operate a horizontally disposed reactor wherein the reaction mixture is force fed from one end to the other. Where complete reaction is required, the intermingling or intermixing of material of different degrees of reaction during the high viscosity stage of reaction may be relatively unimportant; but, where the reaction is to go to a certain degree of completeness and uniform reaction, such as in the partial alcoholysis of polyvinyl acetate, is desired, it is essential to prevent intermingling parallel to the flow of the reactants.

The raw material is preferably fed at the top of the vertically disposed reactor and the product finds its exit at the bottom. However, the flow of the reaction mixture may be reversed, in which case, pressure feed may be necessary. When the reactor is in horizontal position, the reaction mixture may be conducted through the reactor from one end to the other.

There is much latitude permissible in the number size and shape of the agitator blades or paddles and of the fixed baffles in the reactor. These factors are determined by the reaction conditions necessary in any given case and depend also upon the size of the operation. Generally, the agitator blades and the baffles will be so designed as to provide maximum agitation with minimum requirement of energy. Preferably, the moving agitator blade has a tear drop shape and the wide edge leads during the passage into the massed balls and reaction mixture.

The production of polyvinyl alcohol from polyvinyl acetate can be carried out by three-stage alcoholysis process. The reactants comprising a solution of polyvinyl acetate in methanol and a suitable catalyst such as sodium methylate can be premixed in simple apparatus provided this mixture is fed to the second stage at a time interval not long enough to result in the alcoholysis of more than 30 to 40% of the acetate group. In the alcoholysis range between about 30 to 40% and about 70 to 80%, the reaction mixture passes through the viscous gel phase. While passing through this range of the alcoholysis reaction, the reaction mixture must be properly agitated if a uniform product is to result. This is best accomplished by conducting this high viscosity or gel phase of the alcoholysis reaction in a ball filled kneader reactor of the type described. In this reactor the mixture is subjected to uniform agitation substantially at right angle to the direction of flow so that substantially no agitation and therefore, no intermixing parallel to the direction of flow results. This insures uniformity of reaction as the mixture travels through the ball filled reactor and the extent of the reaction can be controlled by the amount of catalyst and reactants present, by the temperature and by the rate or time of travel through the reactor. The agitated ball filled reactor permits continuous production of a product of predetermined uniformity.

After about 75% of the polyvinyl acetate has been alcoholized, the polymer mixture requires no further agitation to prevent cohesion of the particles formed up to this stage. The mixture can now be allowed to alcoholize without further agitation until the proper degree of alcoholysis has been attained. This phase of the reaction may be allowed to proceed on a moving belt reactor as illustrated in Figure 6. Syneresis of the product takes place during this part of the reaction and alcoholysis may be stopped at the desired degree of reaction by subjecting the mixture to quick neutralization or other rapid inactivation of the catalyst.

*Example 1*

A 30% solution of high viscosity polyvinyl acetate (60 cps. of a molar solution in benzene at 20° C.) in methanol was mixed continuously at the rate of 130 grams per minute at 30° C. with 20 cc. per minute of methanol containing 2.5% sodium methylate also at 30° C. in a premixer. This mixture was fed continuously at a rate of about 146 grams per minute to the ball filled reactor described above wherein a reaction temperature of 30° C. was maintained. Time of passage of the reaction mixture through the reactor was 10 minutes. The product was withdrawn continuously and held an additional 10 minutes after which time it was neutralized with acetic acid dissolved in methyl acetate. The product leaving the ball filled reactor was 75% alcoholized and was soluble in water at 0–5° C. but insoluble in water at 70–100° C. The product after neutralization was 88% alcoholized and was soluble in hot and cold water. The product, after drying, was of a particle size such that all of it passed through a 12 mesh screen and 5% passed through a 40 mesh screen. This process was operated continuously for many hours with substantially uniform results from hour to hour.

*Example 2*

A 50% solution of low viscosity polyvinyl acetate (5 cps. of a molar solution in benzene at 20° C.) in methanol was continuously mixed at a rate of 130 grams per minute with 18 cc. per minute of a 5% solution of sodium methylate in methanol in a premixer at 30° C. This mixture was fed continuously at a rate of about 145 grams per minute to the ball filled reactor previously described. A reaction time of 10 minutes at 30° C. was maintained in the reactor. After leaving the reactor, the product was held without agitation for another 10 minutes and was then continuously neutralized with acetic acid in methyl acetate. The final product was soluble in water at 0–5° C. and insoluble in water at 70–100° C. The product, after drying, was of a particle size of which all passed through a 20 mesh screen and 50% passed through a 60 mesh screen. The quality of the product was remarkably uniform from hour to hour of continuous operation.

*Example 3*

Raw materials, apparatus and conditions were the same as in Example 1 except that the product leaving the ball filled reactor was held without agitation for 30 minutes instead of 10 minutes. The final product represented 99% alcoholysis and was insoluble in water at 25° C. and completely soluble at 80° C. The 10% aqueous solutions made at 80° C. and stored at 50° F. gelled in 10 hours.

*Example 4*

This example duplicated Example 1 except that the product leaving the ball filled reactor was held without agitation for 20 minutes instead of 10 minutes. The final product represented 98% alcoholysis and was insoluble in water at 25° C. and completely soluble at 80° C. The 10% aqueous solutions made at 80° C. and stored at 50° F. had not gelled after 20 days.

In general, it was observed that if the polyvinyl acetate was alcoholized up to 70–75%, the final product is obtained in an easily crumbled state without further agitation since the particle size will be essentially set at that point. If the reaction leaves the ball filled reactor at less than about 70% alcoholysis, the final product will be a tough rubber-like gel. Alcoholysis beyond 75% is accompanied by syneresis wherein solvent in excess of about 150% by weight of the resin exudes from either the gel or the crumbled mass. This phenomenon is independent of the molecular weight of the polymer and it simplifies the isolation of products of alcoholysis above 80% replacement of acetate groups.

The novel type of reactor which is here disclosed is useful in conducting other reactions than the alcoholysis of polyvinyl esters. Wherever the reaction mass tends to gel or to form a highly viscous mass offering great difficulty of control and agitation or mixing is essential, the present reactor offers great advantage. Reactions for which this apparatus is suitable relate to the production of thermosetting resins where ingredients are to be mixed and condensed to a definite point dependent upon a time lapse. Systems which require intensive kneading or shearing action while reacting and where end to end intermixing as in a back kneader is undesirable can be carried out with much greater success by the aid of the ball filled mill of the design invented by me. The continuous vulcanization of rubber or synthetic elastomers in certain phases can be conducted to advantage in the present mill. In general, any system which must undergo reaction through a viscous phase in a minimum time and requires intensive mixing can be conducted in the ball filled mill.

I claim:

1. In apparatus for mixing a viscous reaction mass a cylinder, an axially disposed rotatable agitator shaft within said cylinder, free balls all of the same size and in numbers substantially to fill said cylinder, fixed baffles attached to the inner wall of said cylinder and extending radially toward the agitator shaft, agitator blades attached to said shaft in staggered relation to said baffles and extending radially toward the inner wall of said cylinder, the clearance between the baffles and the next adjoining agitator blades being in excess of two ball diameters.

2. In apparatus for mixing a viscous reaction mass a cylinder, an axially disposed rotatable agitator shaft within said cylinder, free flowing spheres or balls all of the same size and in numbers substantially to fill said cylinder, fixed baffles attached to the inner wall of said cylinder and extending radially to a distance exceeding by a small fraction one ball diameter from said shaft, agitator blades attached to said shaft in staggered relation to said baffles and extending radially to a distance exceeding by a small fraction one ball diameter from the inner wall of said cylinder, the clearance between the baffles and the next adjoining agitator blades being slightly in excess of two ball diameters.

3. In apparatus for continuously mixing a viscous reaction mixture a cylinder, an axially disposed rotatable agitator shaft within said cylinder, free flowing spheres or balls all of the same size and in numbers substantially to fill said cylinder, fixed baffles attached to the inner wall of said cylinder and extending radially to a distance exceeding by a small fraction one ball diameter from said shaft, agitator blades attached to said shaft in staggered relation to said baffles and extending radially to a distance exceeding by a small fraction one ball diameter from the inner wall of said cylinder, the clearance between the baffles and the next adjoining agitator blades being slightly in excess of two ball diameters, and inlet and outlet means for feeding reaction mixture to the reactor and withdrawing reaction products at a predetermined rate, said inlet and outlet means being at opposite ends of said cylinder.

4. The apparatus of claim 1 in which the radial distance between the agitator shaft and the inner wall of the cylinder is less than ten times the diameter of the spheres or balls filling said cylinder.

5. In apparatus for continuously mixing a viscous reaction mixture a vertical cylinder, an axially disposed rotatable agitator shaft within said cylinder, free flowing spheres or balls all of the same size and in numbers substantially to fill said cylinder, fixed baffles attached to the inner wall of said cylinder and extending radially to a distance exceeding by a small fraction one ball diameter from said shaft, agitator blades attached to said shaft in staggered relation to said baffles and extending radially to a distance exceeding by a small fraction one ball diameter from the inner wall of said cylinder, the clearance between the baffles and the next adjoining agitator blades being in excess of two ball diameters, and inlet and outlet means for feeding reaction mixture to the reactor and withdrawing reaction products at a predetermined rate, said inlet and outlet means being at opposite ends of said cylinder.

6. The apparatus of claim 5 in which the radial distance between the agitator shaft and the inner wall of the cylinder is less than ten times the diameter of the spheres or balls filling said cylinder.

7. A process for reacting a viscous mixture comprising feeding the mixture into an elongate reaction zone wherein the mixture, as reaction proceeds, is subjected to intensive kneading or shearing action of balls which are all of the same size and substantially fill the reaction zone, said agitation being essentially directed at right angles to the flow of the reaction mixture thereby substantially excluding extensive intermixing of the reaction mixture parallel to its flow through the reaction zone.

8. A process for converting polyvinyl acetate to polyinvyl alcohol comprising passing a solution of said acetate in methanol and mixed with alcoholysis catalyst into a vertically extended reaction zone wherein the mixture, as alcoholysis proceeds, is subjected to intensive milling action of balls which fill the reaction zone, said balls being agitated essentially at right angles to the flow of the mixture.

9. In a process for the alcoholysis of polyvinyl acetate dissolved in methanol the step consisting of passing the alcoholysis mixture after alcoholysis of about 30 to 40% of the polyvinyl acetate has occurred into a vertical elongated cylindrical vessel filled with balls all of the same size and subjecting the balls to radial agitation in a manner to prevent substantial intermixing parallel to the direction of flow through said cylindrical vessel of the mixture undergoing alcoholysis and adjusting the rate of flow of said mixture through said vessel so that said mixture will leave said vessel after about 70 to 80% alcoholysis of said vinyl acetate has been effected.

10. The continuous process comprising mixing a methanol solution of polyvinyl acetate with alkaline alcoholysis catalyst and feeding the resulting mixture after about 30 to 40% of the acetate groups in said polymer have been alcoholized into one end of a vertical elongated cylindrical vessel filled with balls all of the same size, subjecting the balls to radial agitation thereby uniformly agitating the reaction mixture substantially at right angle only to the flow of said mixture through said cylindrical vessel, removing the mixture from the other end of said elongated cylindrical vessel at such a rate that between about 70 and 80% of the acetate groups of said polymer shall have been alcoholized, thereafter allowing the alcoholysis to proceed without agitation of said mixture and then quickly neutralizing said alcoholysis catalyst in said mixture upon achieving the predetermined degree of alcoholysis.

References Cited in the file of this patent

UNITED STATES PATENTS

| | | |
|---|---|---|
| 145,027 | Stoll | Nov. 25, 1873 |
| 1,956,293 | Klein et al. | Apr. 24, 1934 |
| 2,479,360 | Howard | Aug. 16, 1949 |
| 2,481,388 | Bryant | Sept. 6, 1949 |